US011275221B2

(12) United States Patent
Takano et al.

(10) Patent No.: US 11,275,221 B2
(45) Date of Patent: Mar. 15, 2022

(54) SPRINGLESS RETENTION STRUCTURE FOR AN INGRESS PROTECTED HYBRID CONNECTOR ASSEMBLY

(71) Applicant: Senko Advanced Components Inc, Marlborough, MA (US)

(72) Inventors: Kazuyoshi Takano, Tokyo (JP); Jeffrey Gniadek, Oxford, ME (US); Paul Newbury, Ashland, MA (US)

(73) Assignee: Senko Advanced Components, Inc., Marlborough (MA)

( * ) Notice: Subject to any disclaimer, the term of this patent is extended or adjusted under 35 U.S.C. 154(b) by 0 days.

(21) Appl. No.: 16/654,767

(22) Filed: Oct. 16, 2019

(65) Prior Publication Data
US 2020/0116957 A1 Apr. 16, 2020

Related U.S. Application Data

(60) Provisional application No. 62/746,423, filed on Oct. 16, 2018.

(51) Int. Cl.
G02B 6/38 (2006.01)
(52) U.S. Cl.
CPC ......... *G02B 6/3891* (2013.01); *G02B 6/3847* (2013.01)
(58) Field of Classification Search
CPC .. G02B 6/3891; G02B 6/3847; G02B 6/3825; G02B 6/3817
See application file for complete search history.

(56) References Cited

U.S. PATENT DOCUMENTS

| 3,901,574 | A | * | 8/1975 | Paullus | H01R 13/623 439/315 |
| 10,649,152 | B1 | * | 5/2020 | Yang | G02B 6/3817 |
| 2006/0089049 | A1 | | 4/2006 | Sedor | |
| 2007/0249218 | A1 | | 10/2007 | Hanning et al. | |
| 2008/0050070 | A1 | | 2/2008 | Gurreri et al. | |
| 2009/0148102 | A1 | * | 6/2009 | Lu | G02B 6/3849 385/60 |
| 2009/0202207 | A1 | | 8/2009 | Grzegorzewska et al. | |
| 2011/0075971 | A1 | | 3/2011 | Elenbaas et al. | |

(Continued)

FOREIGN PATENT DOCUMENTS

JP 2020-134836 * 8/2020 ............... G02B 6/36

OTHER PUBLICATIONS

International Search Report and Written Opinion, Application No. PCT/US19/56564, dated Jan. 14, 2020, pp. 10.

(Continued)

*Primary Examiner* — Leslie C Pascal

(57) ABSTRACT

An optical connector assembly a first structure and a second structure, the two structures secured together using a retention structure to form a hybrid assembly. The retention structure uses a slot apex located in a slot channel for securing at least one latch pin of a coupling nut to an adapter housing forming the ingress protected connector without the use of a bias spring. The hybrid assembly is designed to resist water or debris ingress, and may eliminate the use of a bias force to further resist separating the hybrid assembly. When the latch pin passes over the apex and resides in a recess, an audible sound is made indicating the hybrid assembly adapter and coupling nut is mated.

12 Claims, 27 Drawing Sheets

(56) References Cited

U.S. PATENT DOCUMENTS

| | | | | |
|---|---|---|---|---|
| 2012/0020618 A1* | 1/2012 | Erdman | ............... | G02B 6/3851 |
| | | | | 385/33 |
| 2013/0244466 A1 | 9/2013 | Cole et al. | | |
| 2014/0321813 A1* | 10/2014 | Lu | ........................ | G02B 6/3887 |
| | | | | 385/78 |
| 2015/0177467 A1* | 6/2015 | Gniadek | .............. | H01R 13/623 |
| | | | | 385/58 |
| 2016/0139343 A1* | 5/2016 | Dean, Jr. | ............... | G02B 6/3869 |
| | | | | 385/78 |
| 2017/0031108 A1 | 2/2017 | Gniadek et al. | | |
| 2017/0219779 A1 | 8/2017 | Takano et al. | | |
| 2017/0365962 A1 | 12/2017 | Gniadek | | |
| 2018/0143381 A1* | 5/2018 | Liu | ...................... | G02B 6/3825 |

OTHER PUBLICATIONS

International Preliminary Report on Patentability from counterpart application PCT/US2019/056564, dated Apr. 14, 2021, 7 pp.

* cited by examiner

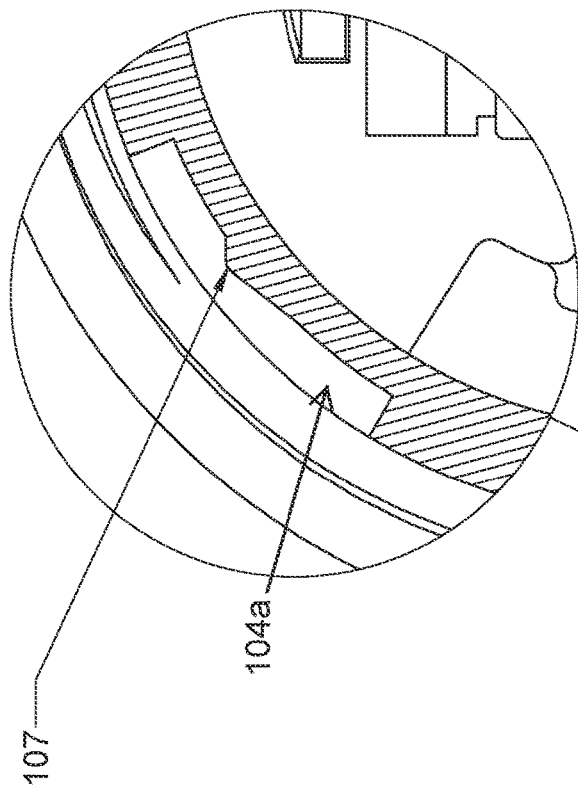
FIG. 1E
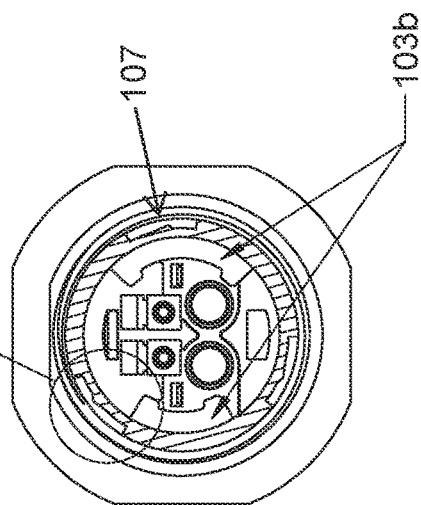
FIG. 1D
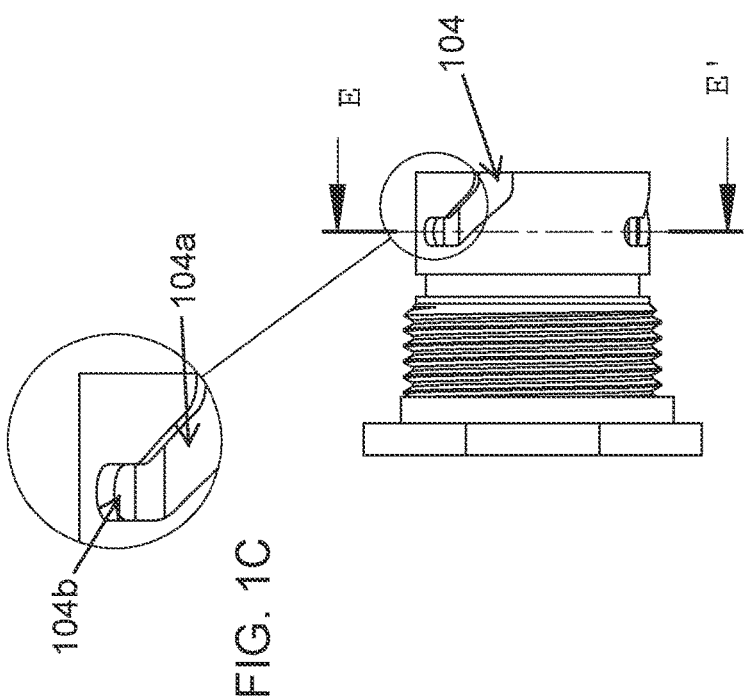
FIG. 1C
FIG. 1B

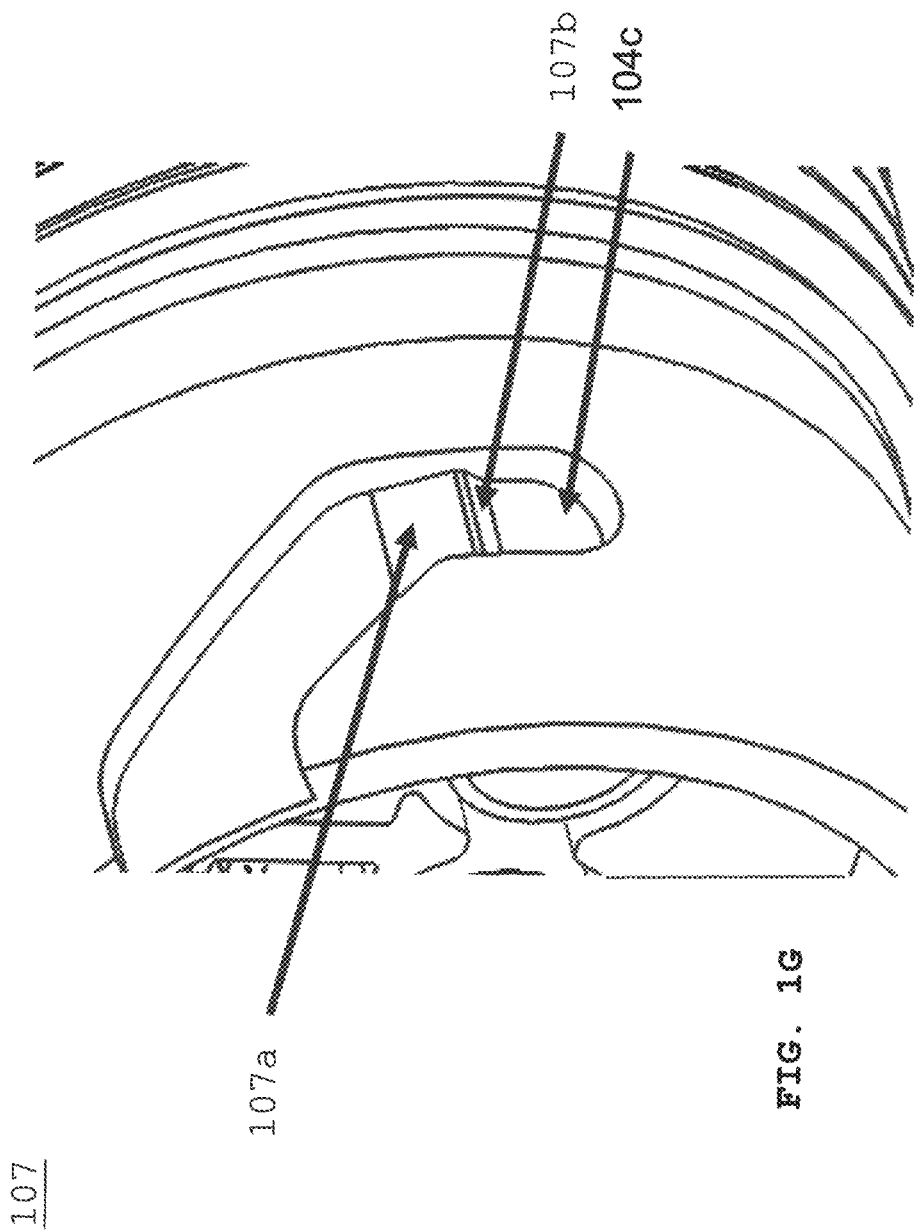

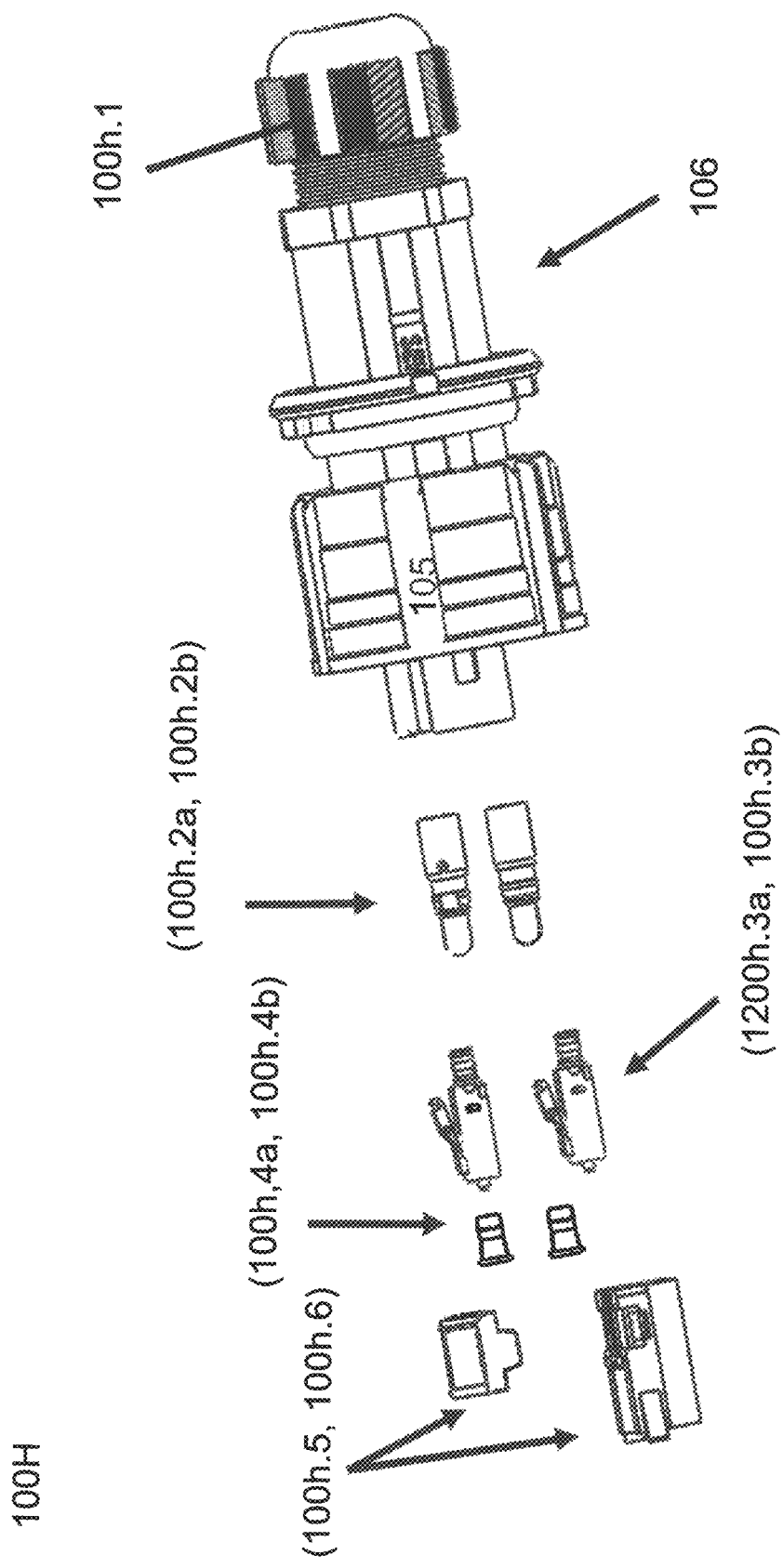

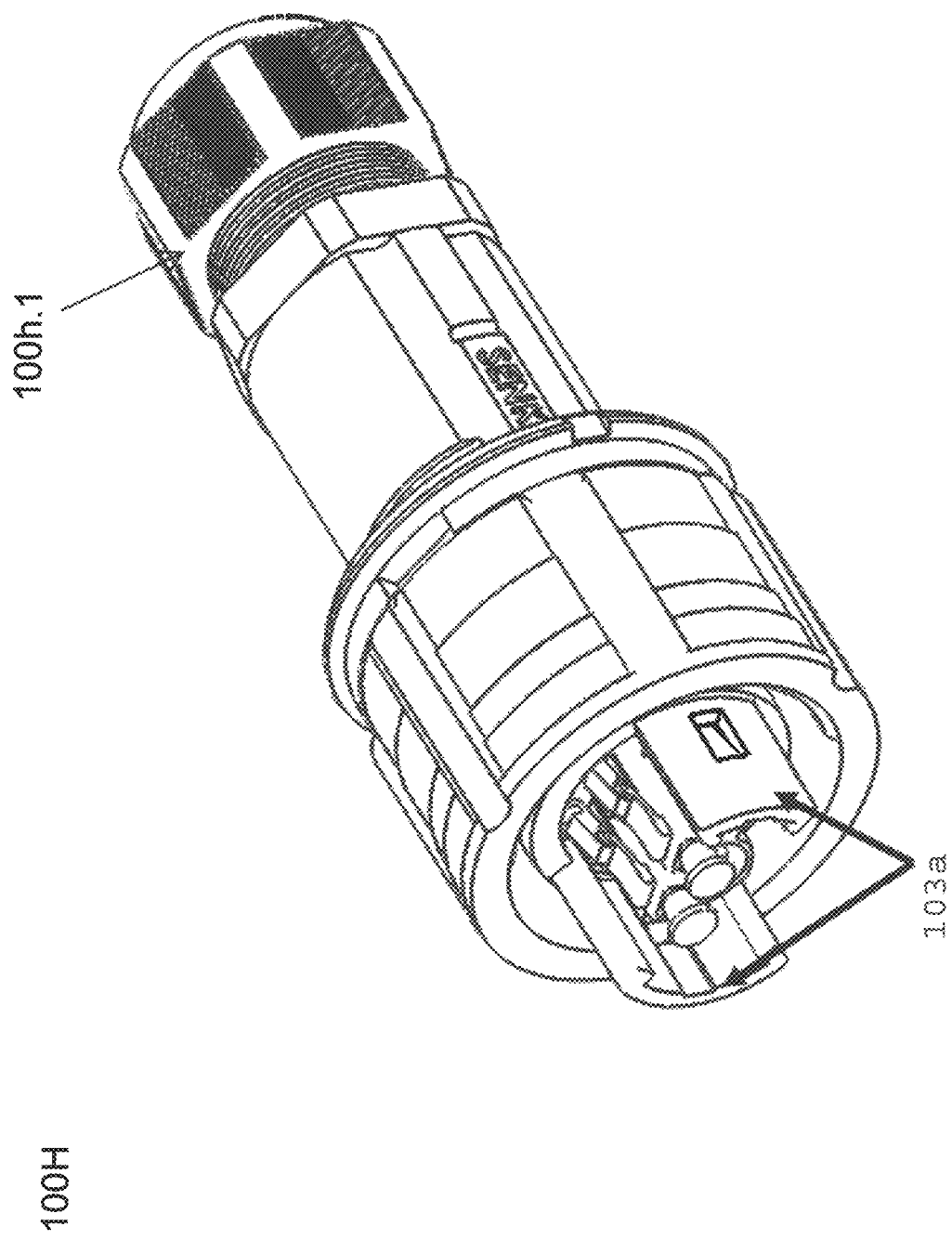

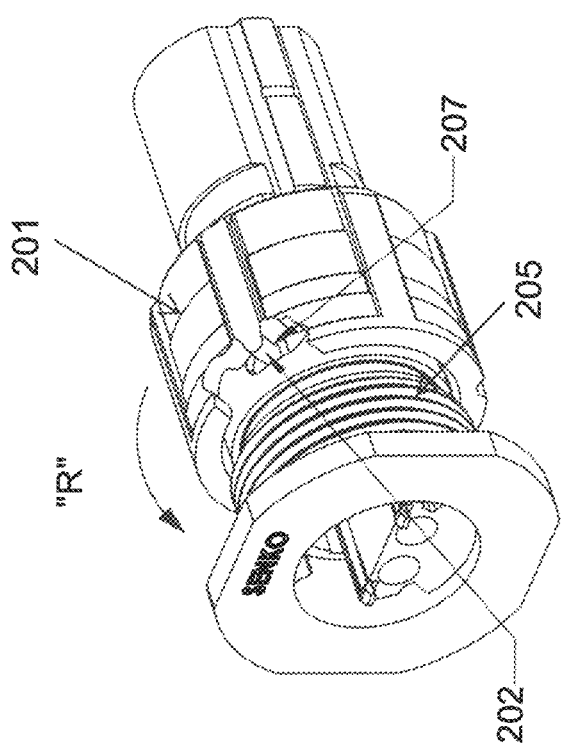

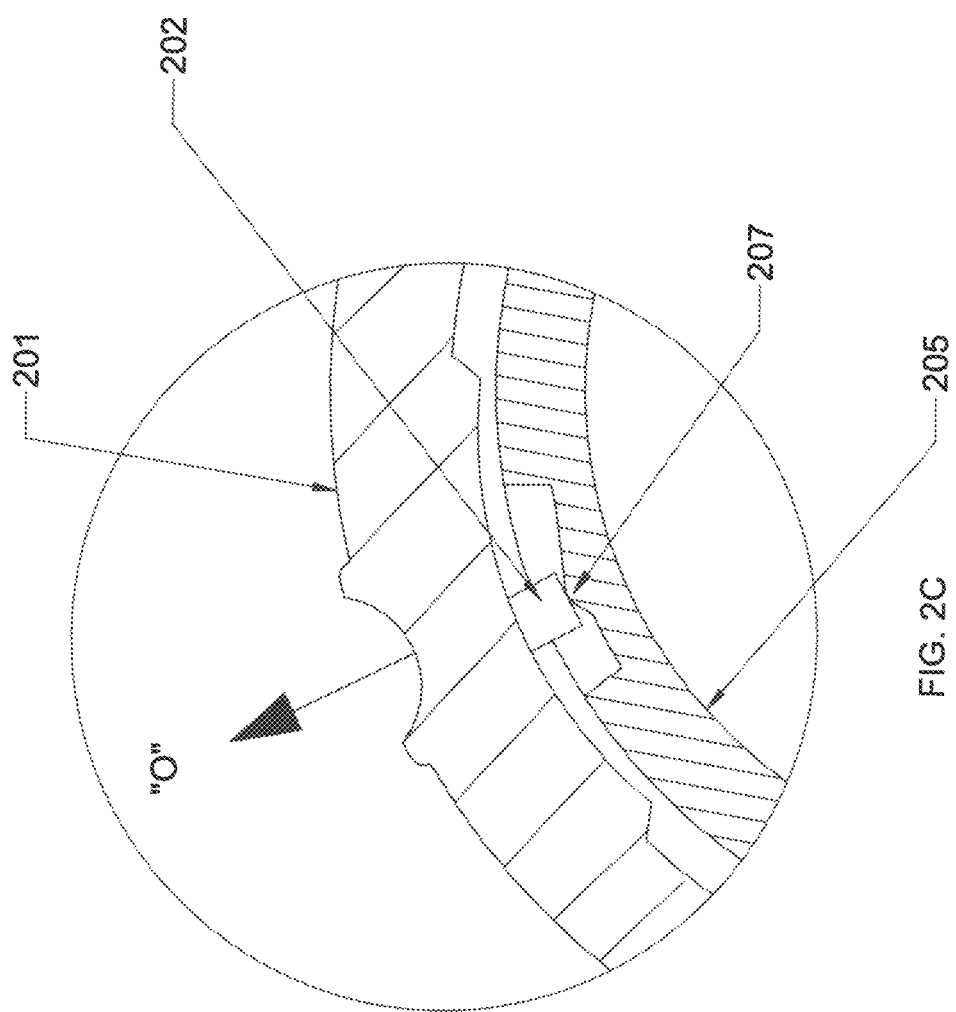

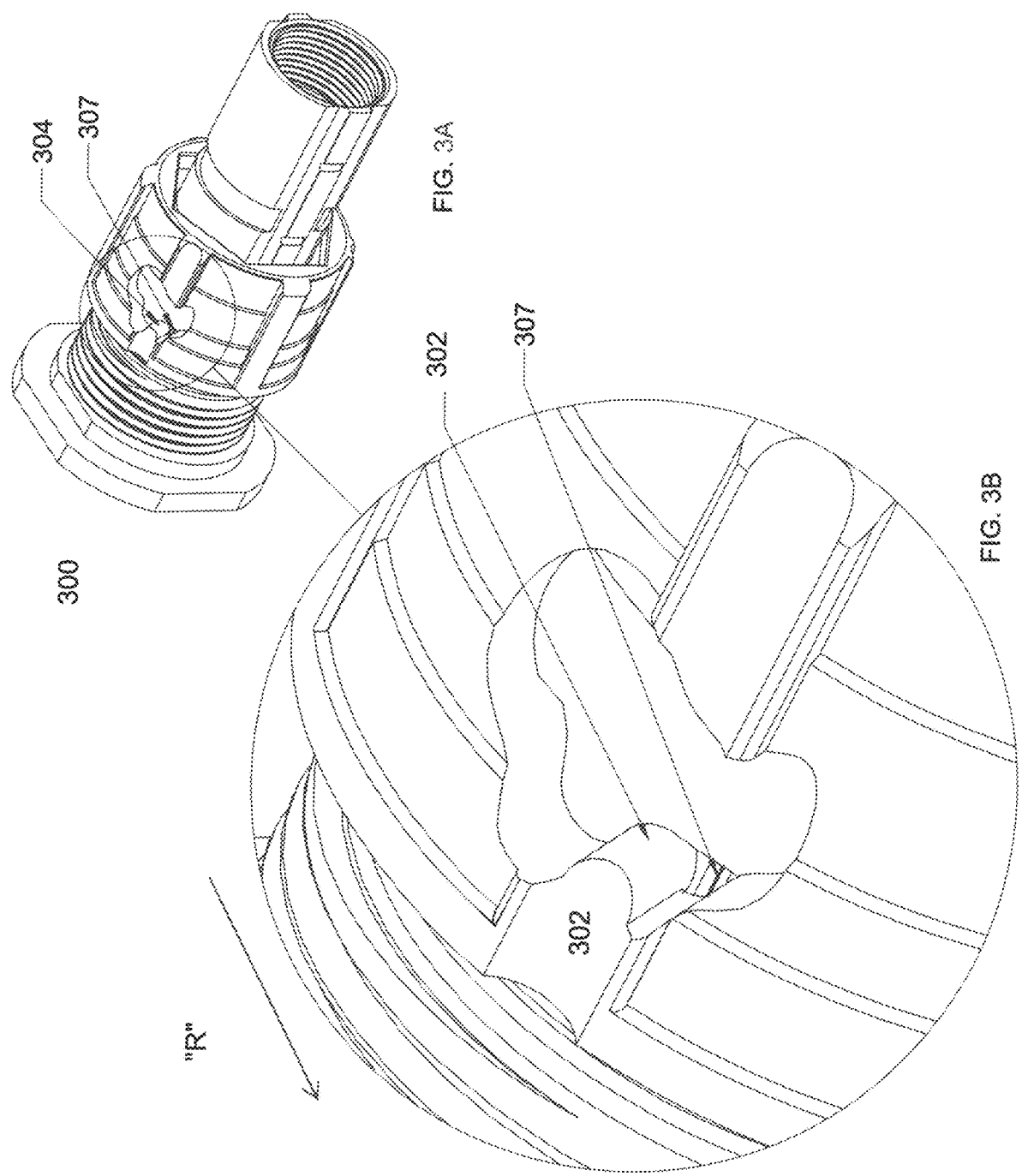

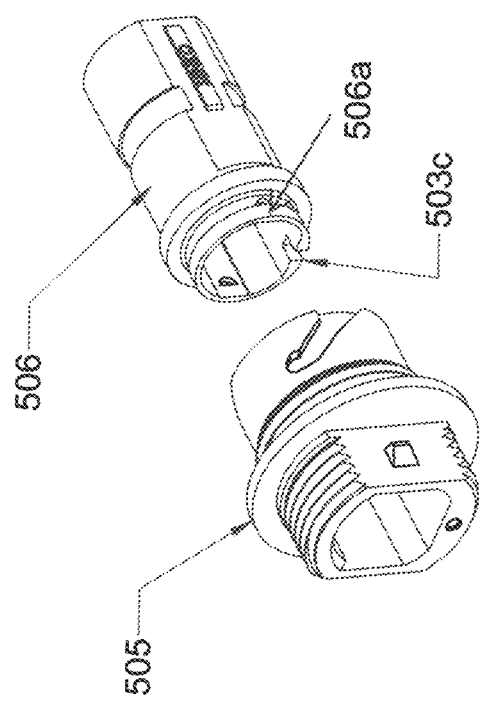

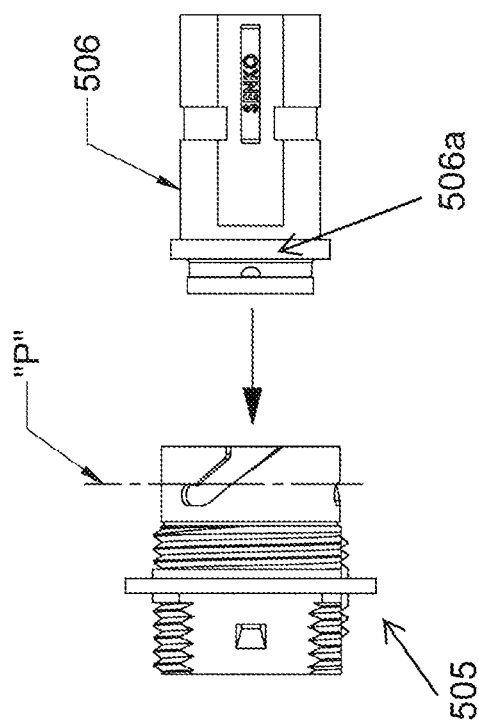

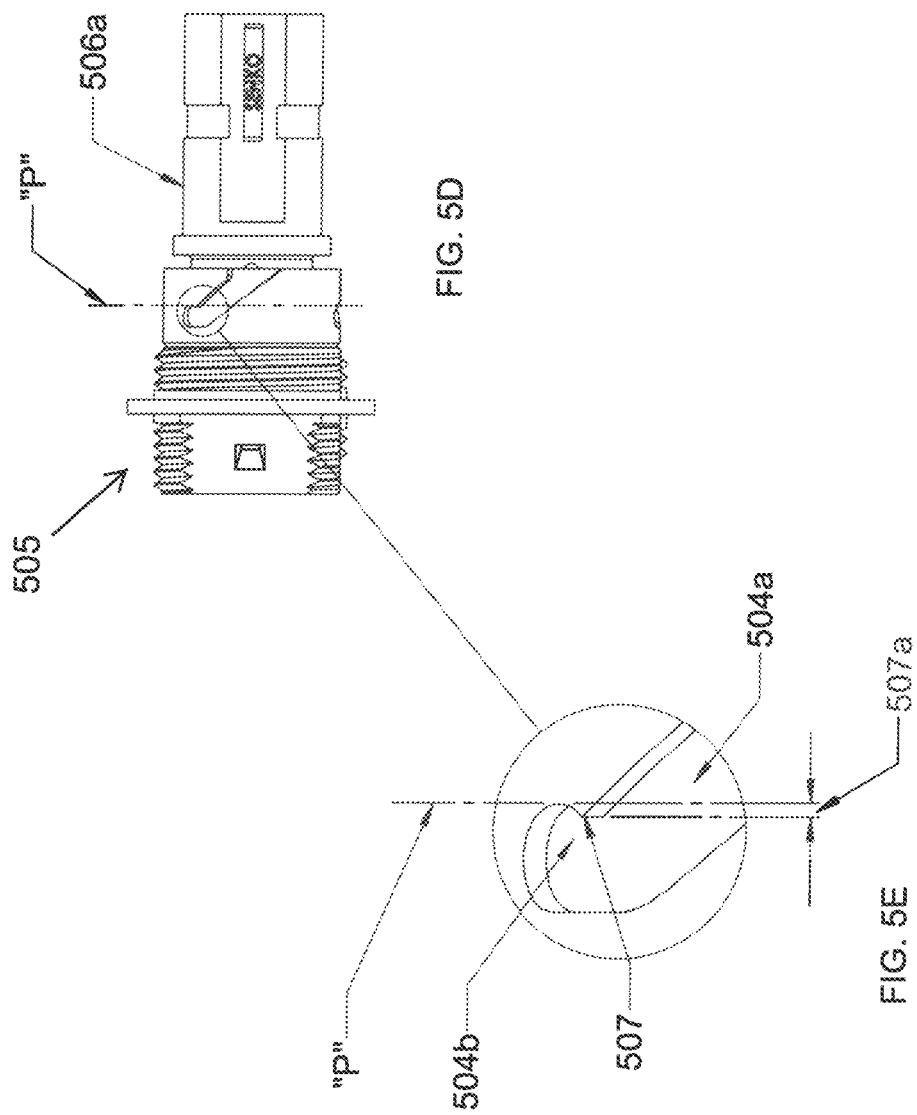

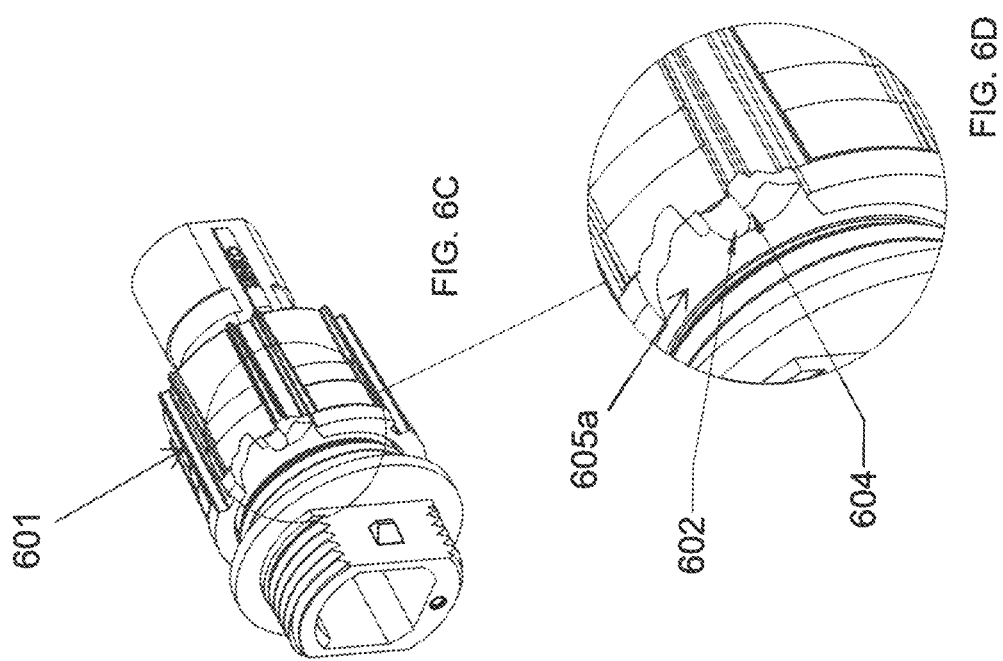

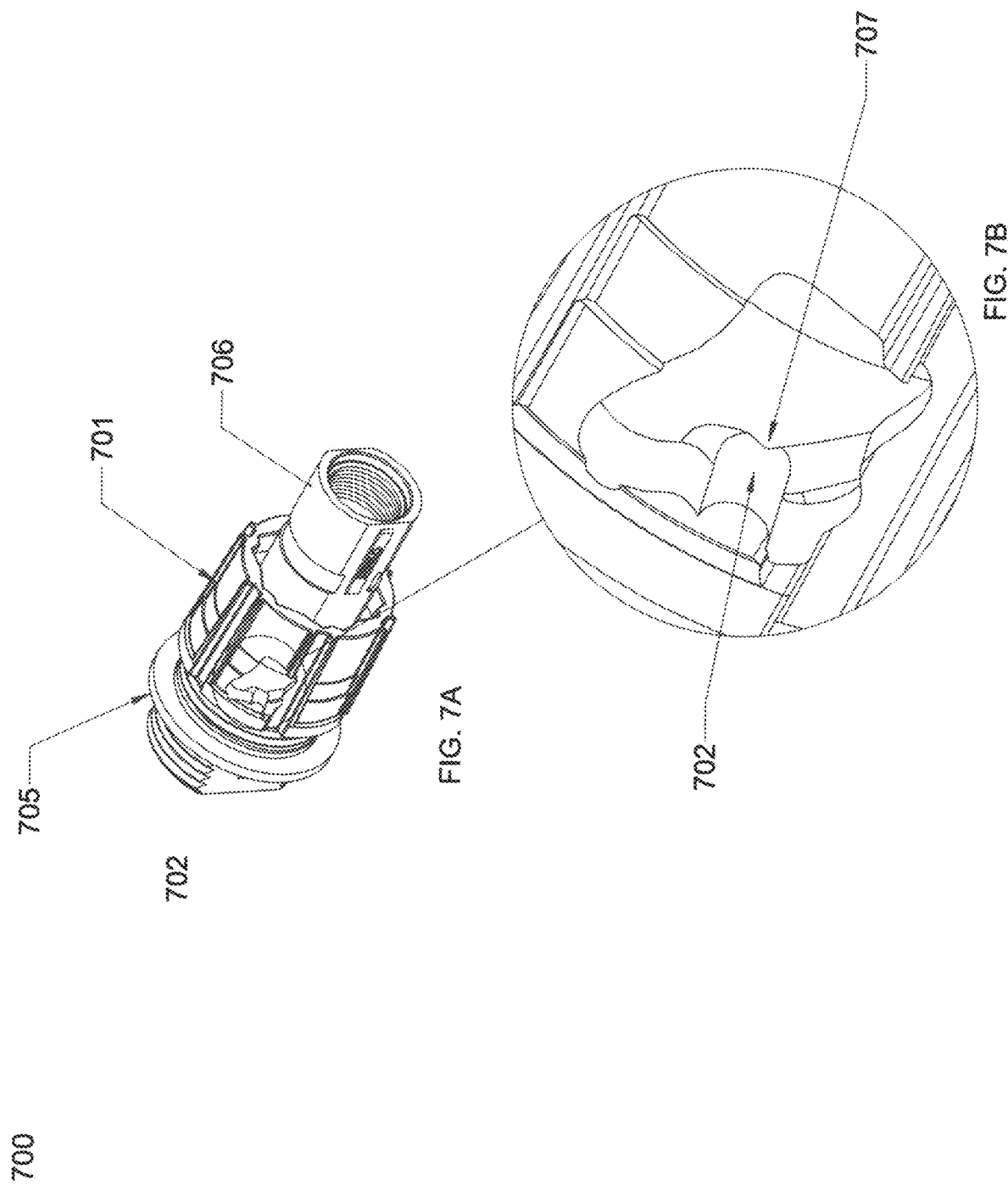

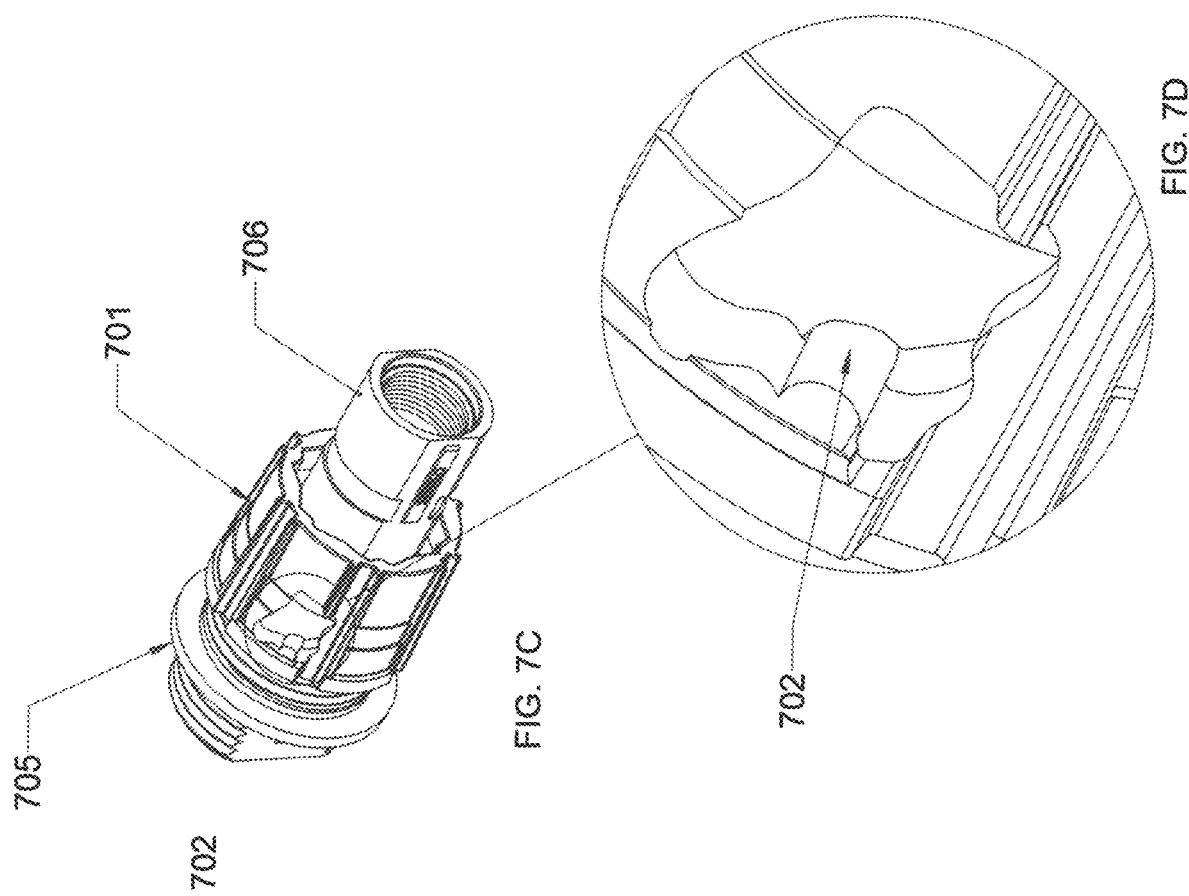

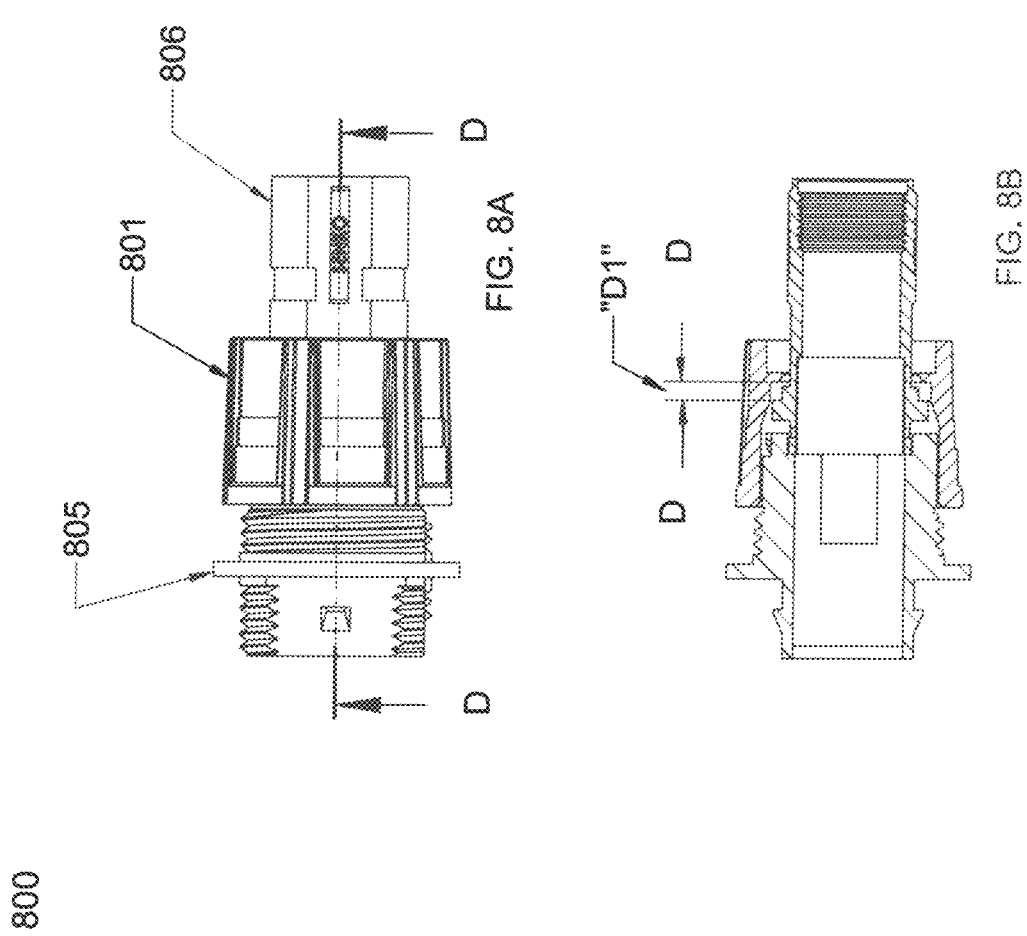

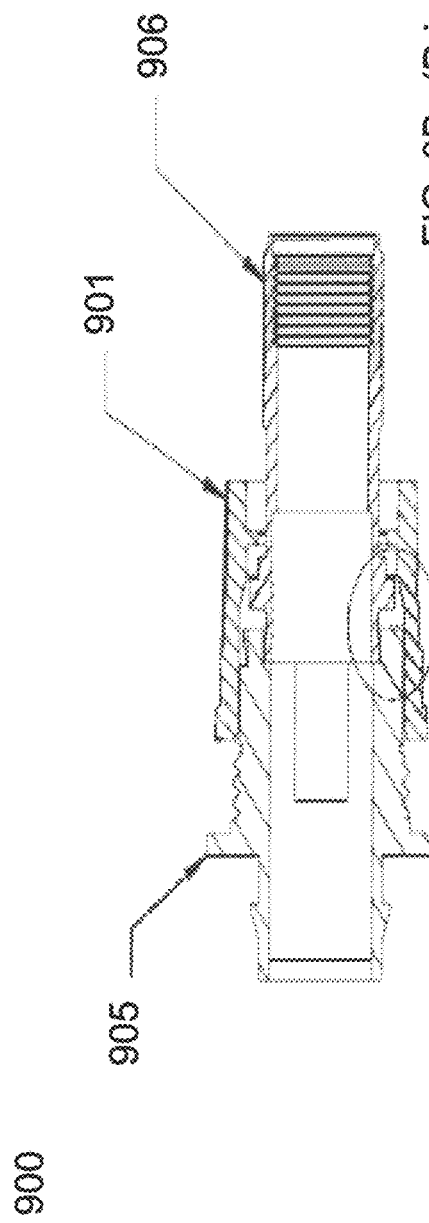
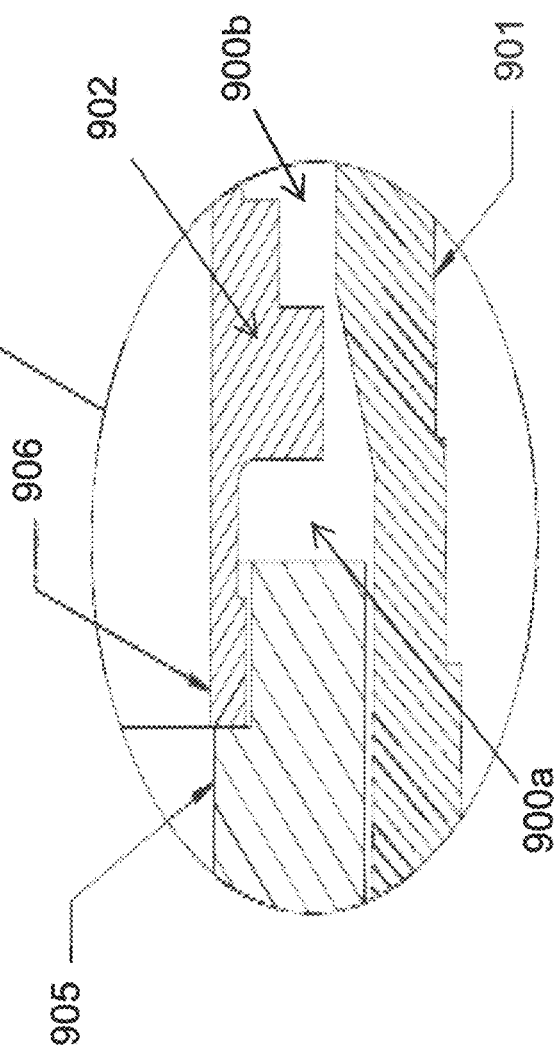
FIG. 9B (Prior Art)
FIG. 9C (Prior Art)

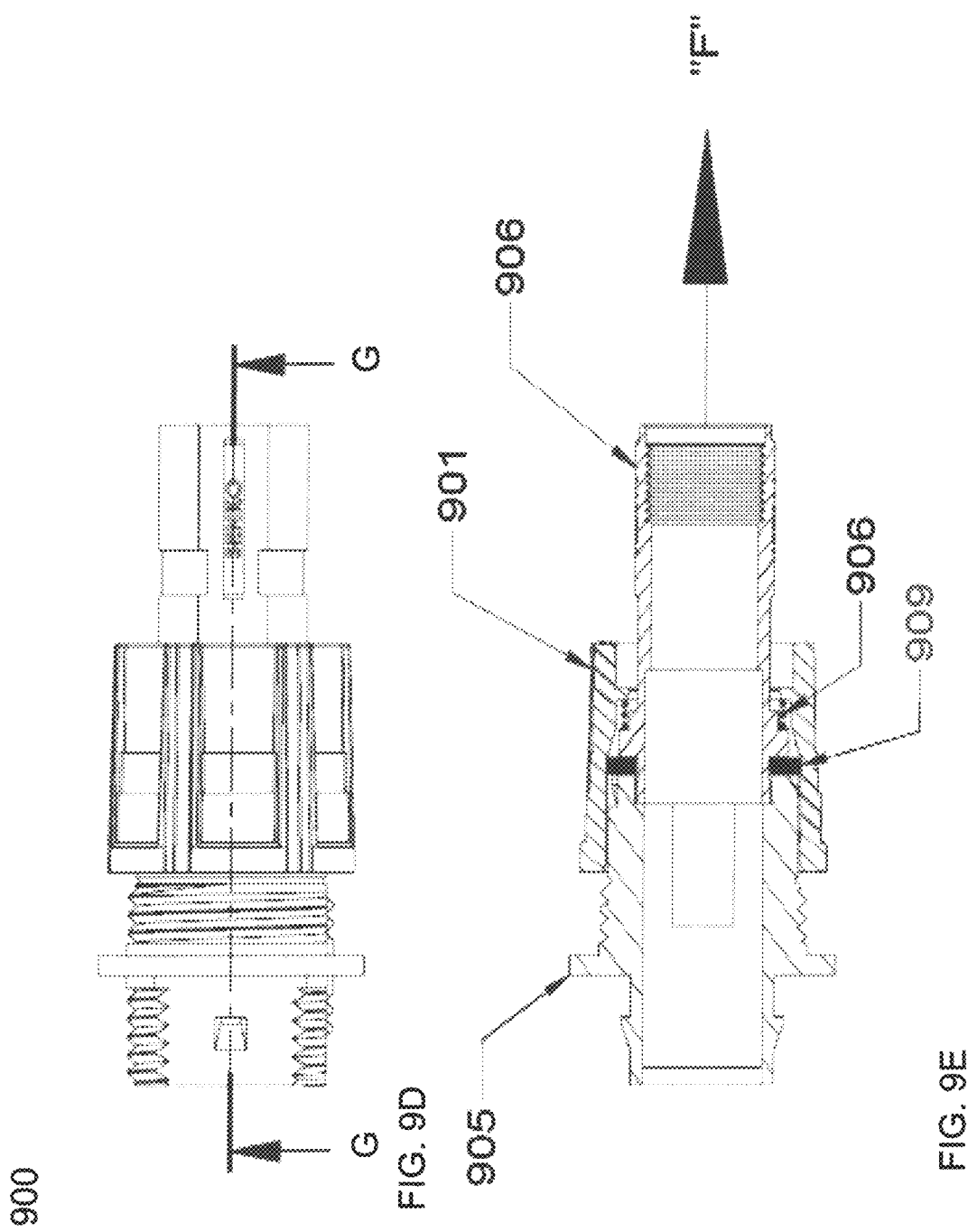

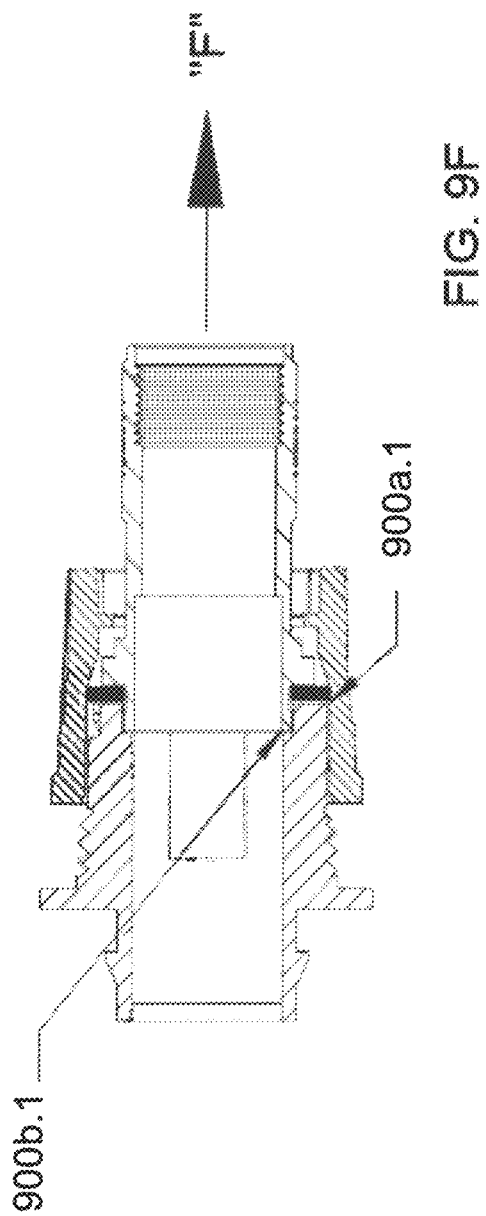

SPRINGLESS RETENTION STRUCTURE FOR AN INGRESS PROTECTED HYBRID CONNECTOR ASSEMBLY

CROSS REFERENCE TO RELATED APPLICATIONS

The present application is claiming priority to U.S. Provisional Application 62/746,423 filed on Oct. 16, 2018, which is fully incorporated herein by reference.

FIELD OF THE INVENTION

The present disclosure relates generally to fiber optic connectors and systems, and specifically to optical fiber connectors using bayonet mechanism to retain a first portion typically a connector body with a second portion typically an adapter using a coupling nut having the bayonet mechanism. This invention further comprises protection from moisture and debris. This invention may further comprise an in-line adapter within its housing. The adapter accepts a SC, LC or MPO ferrule assembly. Attaching the first portion to a second portion is typically called a hybrid assembly.

BACKGROUND

The prevalence of the Internet has led to unprecedented growth in communication networks. Consumer demand for service and increased competition has caused network providers to continuously find ways to improve quality of service while reducing cost.

Hybrid connectors having both optical fiber and electrical connectors included in a single connector eliminate the need for providing two separate connectors. Electric wires and fiber optic cables may be run together in a single cable, and the ends of the cable may be terminated with a single hybrid connector that is configured to be coupled with an adapter to connect the optical transmission paths of the optical cable to other fiber optic cables or devices, and simultaneously connect the electrical wires to other electrical wires or devices. An adapter generally includes a housing, or portion of a housing, having at least one port which is configured to receive and hold a connector to facilitate the optical and/or electrical connection of one connector to another connector or other device. Adapters may be used to facilitate connections contained within a chassis. The term "chassis" as used herein broadly refers to a containment structure for housing electrical components or switching components.

In external applications wherein the adapters and connectors may be exposed to weather, particularly rain or moisture in general, the connectors may be configured as ingress protection (IP) connectors that are waterproof and resist debris. A standard for such connectors may be an OVDA connector. While each of the various types of optical fiber connectors is different in construction, in order to minimize tooling and manufacturing costs, while also minimizing inventory (the number/variety of parts on hand), there is a need for a connector system having a single adapter and a single connector housing component that mates to an adapter, wherein the connector housing is configured to receive any of a plurality of different connector types (fiber optic and/or electrical) therein for mating of the connectors with other connectors.

BRIEF DESCRIPTION OF THE DRAWINGS

FIG. 1B is perspective side view of latch slot on an outside circumference of an adapter housing;

FIG. 1C is a zoomed view of the latch slot without a retention bump;

FIG. 1D is a front end view of an adapter according to the present invention;

FIG. 1E is a zoomed view of the latch slot apex according to the present invention.

FIG. 1G is a zoomed view of slot apex of FIG. 1F;

FIG. 1H is an exploded view of another hybrid connector deploying the present invention;

FIG. 1I is an assembled view of FIG. 1H;

FIG. 2B is a perspective view of FIG. 2A as bayonet coupling is being rotated "R" to secure bayonet coupling nut to adapter housing;

FIG. 2C is a zoomed view of FIG. 2B cut away illustrating latch pin passing over latch slot apex;

FIG. 3A is a perspective view of the latch pin rotated beyond slot apex and securing in a recess beyond and formed by a slot apex;

FIG. 3B is a zoomed view of FIG. 3A depicting the slot apex;

FIG. 5A is an exploded front end view of another hybrid connector deploying the present invention;

FIG. 5C is an exploded side view of FIG. 5A deploying the latch slot apex of the present invention;

FIG. 5D is an assembled view of FIG. 5C;

FIG. 5E is a zoomed view of latch slot bump or apex;

FIG. 6C is a perspective view with a cut away of bayonet coupling nut with latch pin secured within recess of latch slot of FIG. 6A;

FIG. 6D is a zoomed view of FIG. 6C cut-away;

FIG. 7A is another hybrid connector with cut-away illustrating latch pin at height of latch slot;

FIG. 7B is a zoomed view of FIG. 7A;

FIG. 7C is a perspective view with cut-away of latch pin at mechanical plane;

FIG. 7D is a zoomed view of FIG. 7C;

FIG. 8A is a side view of another hybrid connector assembly deploying the present invention;

FIG. 8B is a cross-section along line D-D of FIG. 8A;

FIG. 9B is a cross-section of FIG. 9A along cut-line A-A';

FIG. 9C is an exploded view of FIG. 9B showing GAP A and GAP B between connector body and adapter or hybrid assembly;

FIG. 9D is a perspective view of another hybrid assembly with a cut-line D-D';

FIG. 9E a cross-section along cut-line D-D' of FIG. 9D showing GAP A with water ingress seal and GAP B with bias spring therein;

FIG. 9F is FIG. 9E with an O-seal I GAP A and a bias spring in GAP B.

DETAILED DESCRIPTION

This disclosure is not limited to the particular systems, devices and methods described, as these may vary. The terminology used in the description is for the purpose of describing the particular versions or embodiments only, and is not intended to limit the scope.

The following terms shall have, for the purposes of this application, the respective meanings set forth below.

An adapter is a device with one or more openings configured to accept a connector. An adapter further comprises a housing, and one or more locking mechanism external or internal to the housing. An internal lock may secure a connector within an opening, and an external lock may secure adapter assembly, the latter including connectors, to a panel using a locking nut. A connector is inserted and secured at either end of adapter, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body, an external latch or recess to secure said connector into adapter opening and one or more ferrules having optic fibers therein. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

A connector typically has an outer wall with a first and second end that are open to accept a cable assembly at the second end and a first end that can accept an adapter.

A hybrid assembly is an adapter and connector coupled together using a bayonet coupling nut to form a signal path from the cable assembly to ferrules or electrical connectors at a first end of the adapter.

Figure 1A:
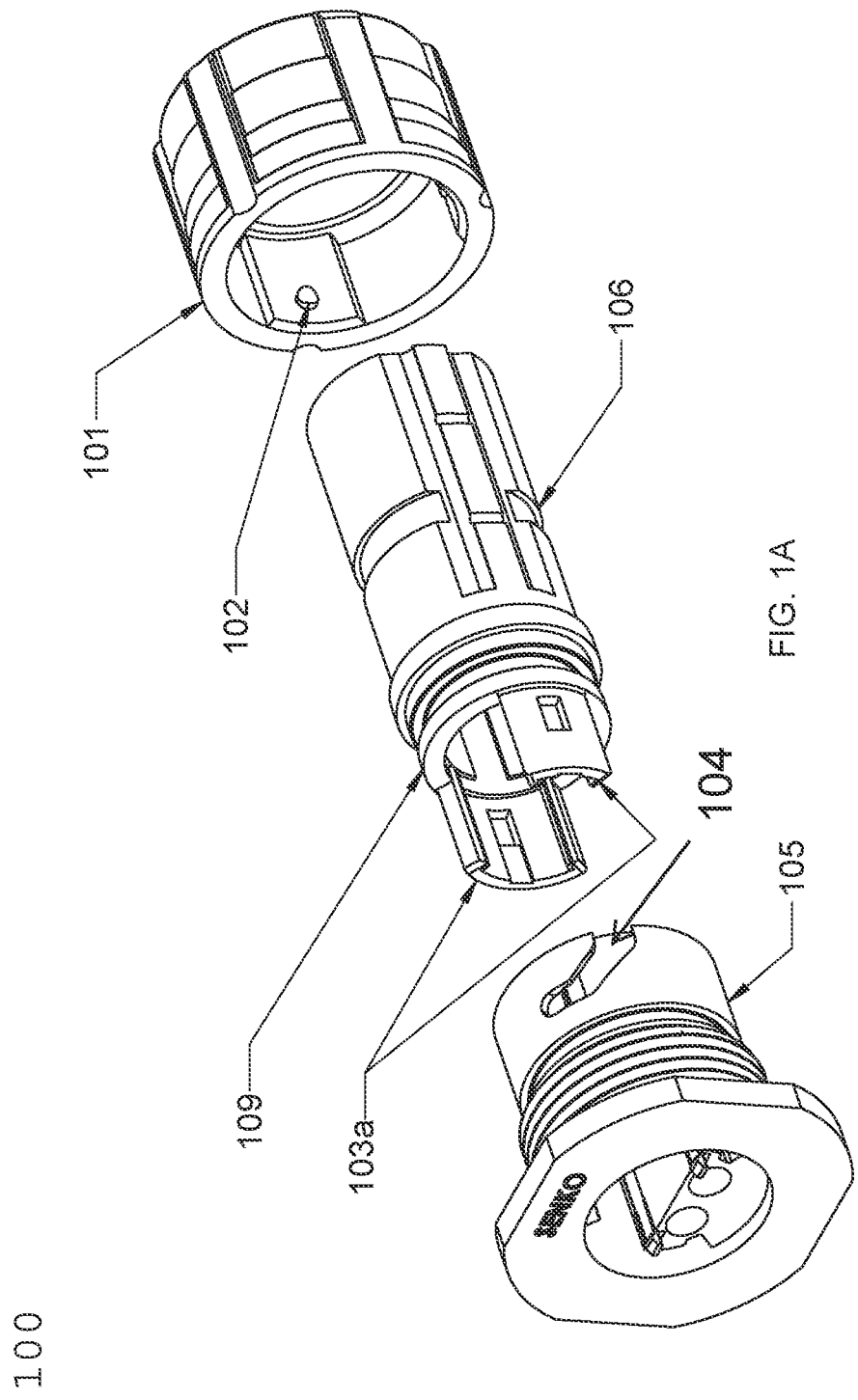
FIG. 1A is an exploded view of a hybrid connector with a connector body and an adapter prior to coupling using a bayonet coupling.
Figure 1F:
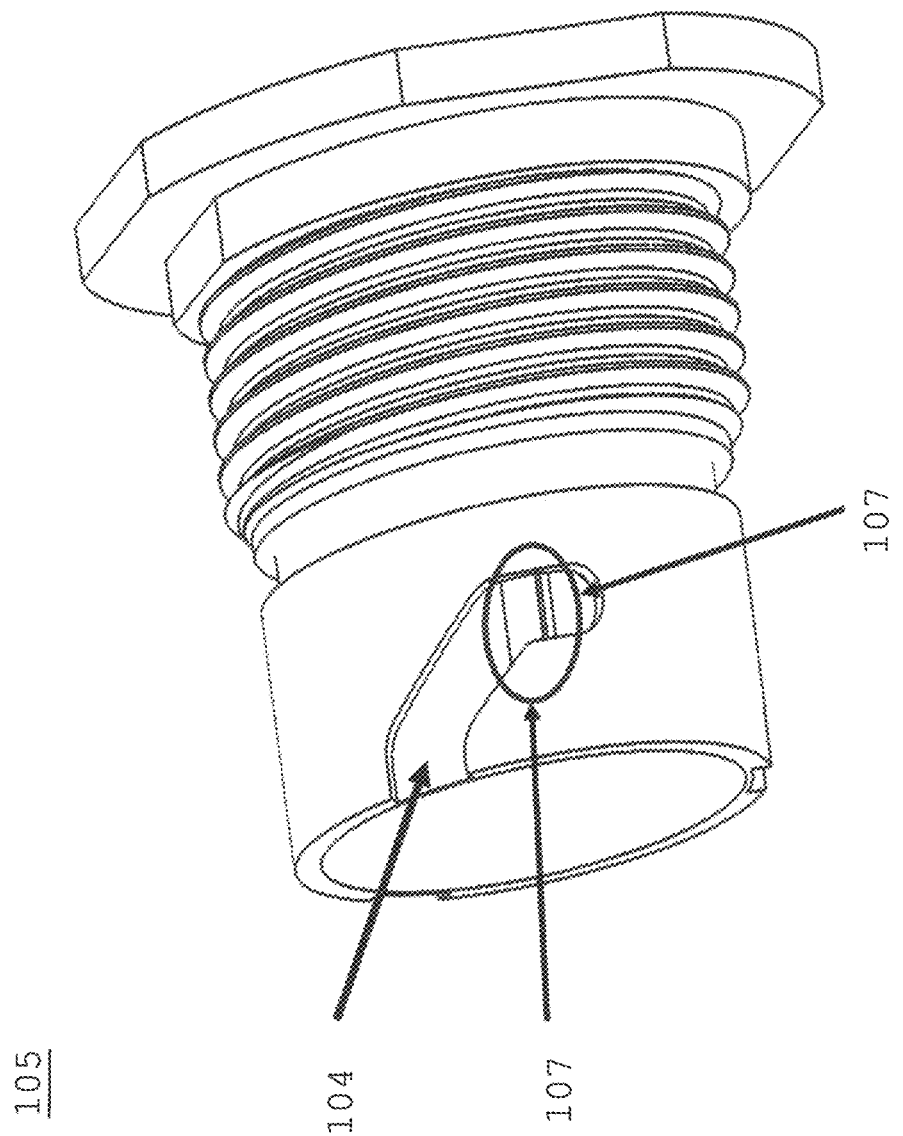
FIG. 1F is a perspective view of adapter housing with the present invention.

FIG. 1A depicts a hybrid connector assembly (100) with bayonet coupling nut (101) having one or more latch pins (102) without latch slot apex (107). The latch pins engage and slide within a corresponding latch slot (104) on adapter (105) outer housing. Coupling nut (101) can capture connector body (106) and O-ring seal (109), the latter protects against water ingress (refer to FIG. 9). Connector body may be called connector housing. FIG. 1B depicts a side view of adapter (105) outer housing further showing latch slot (104) (along cut-line E-E'), without the present invention latch slot apex (107), as shown in FIG. 1F. As shown in FIG. 1C, as bayonet coupling nut latch pin (102) is configured to engage latch slot (104), as the coupling nut is rotated (FIG. 2B) until latch pin (102) is set in upper latch slot channel (104b). As the coupling nut is rotated, pin slides along lower latch slot channel (104a), as shown with no bump or latch slot apex. (at FIG. 1B and FIG. 1C). Latch slot channel (104a) is constant. The at least one latch pin is on an inner surface of the coupling nut at a proximal end of the coupling nut.

FIG. 1D depicts alignment holes (103b) that accept alignment tabs (103a) formed as part of connector housing (106). The tabs help ensure latch pin (102) engages opening in latch slot (104). The tabs also help align the hybrid assembly, at a proximal end of adapter (105), into a second adapter to mate connectors (at FIG. 1E) with corresponding connectors and adapters when using the hybrid assembly. FIG. 1E is a zoomed view of FIG. 1D cut-out showing apex (107) within lower slot (104a) which would be placed along cut-line E-E'. FIG. 1F depicts a top view of slot apex (107) of channel or slot (104) within outer housing of adapter (105). FIG. 1G depicts a zoomed view of FIG. 1F disclosing slot apex (107) having chamfered leading face (107a) and chamfered trailing face (107b), and upper slot recess (104c) where the latch pin resides when bayonet coupling nut is mated to adapter. FIG. 1H depicts another use of the present invention deployed as part of outdoor connector (100H). Connector (100H) secures cable gland (100 h.1) to a distal end of connector housing or connector body (106). At proximal end of adapter (105) which houses a pair of power contact pins (100 h.2 a. 100 h 2.b), a pair of fiber optic connectors (100 h.3 a, 100 h 3b), dust caps for each connector (100 h.4 a, 100 h 4.b), holder (100 h.5) and cover (100 h.6) for the fiber optic connectors. FIG. 1I is an assembled view of FIG. 1H with hybrid connector with cable gland (100 h.1).

Figure 2A:
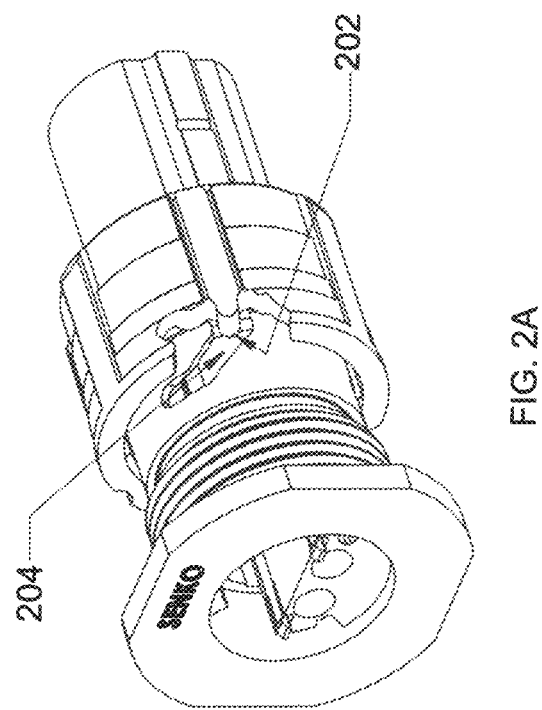
FIG. 2A is a perspective view of a partially assembled hybrid connector of FIG. 1A with a cut-away showing latch pin entering latch slot of the present invention added to the hybrid adapter.

FIG. 2A depicts cut-away of latch pin (202) entering latch slot (204). FIG. 2B depicts rotation "R" of bayonet nut (201) in channel or slot (104) near a distal end of adapter (205). During rotation latch pin (202) passes over slot apex (207). FIG. 2C depicts bayonet coupling nut (201) being distorted outward "O", as pin (202) passes over slot apex (207). The slot apex maybe a bump or protrusion which forms recess 104 c on a forward side of the apex.

Figure 3C:
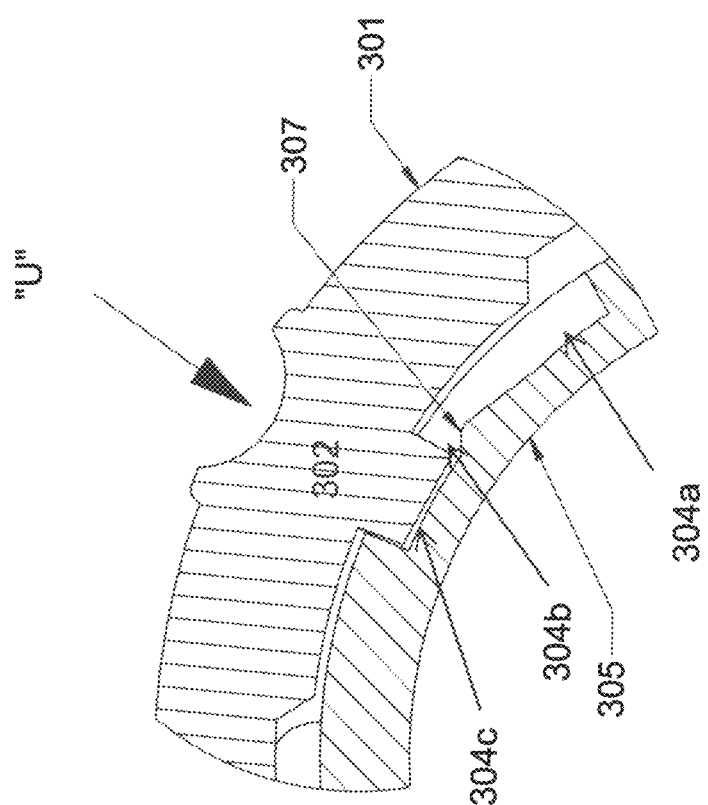
FIG. 3C is a cross-section view of FIG. 3B once latch pin is beyond slot apex where connector is latched onto adapter forming a hybrid assembly.

FIG. 3A depicts an assembled hybrid assembly (300) with a cut-away showing latch pin (302) at end of latch slot (304) in upper channel (104b) just past slot apex (307). FIG. 3B depicts latch pin (302) after passing over slot apex (307) after rotating coupling nut in direction of "R". FIG. 3C depicts cross-section, zoomed view of bayonet coupling nut (301) returned to an undistorted position after latch pin (304) passes over slot apex (307) and resides in recess (304c) formed from upper slot channel (304b) forward of lower slot channel (304a). As shown, latch pin (302) is positioned in recess (304c) in front of slot apex trailing chamfered face (107b) (at FIG. 1G), which prevents bayonet coupling nut (301) from rotating back on itself unless a sufficient force is applied so latch pin (302) can overcome slot apex (307) chamfered trailing face (107b) (at FIG. 1G.)

Figure 4A:
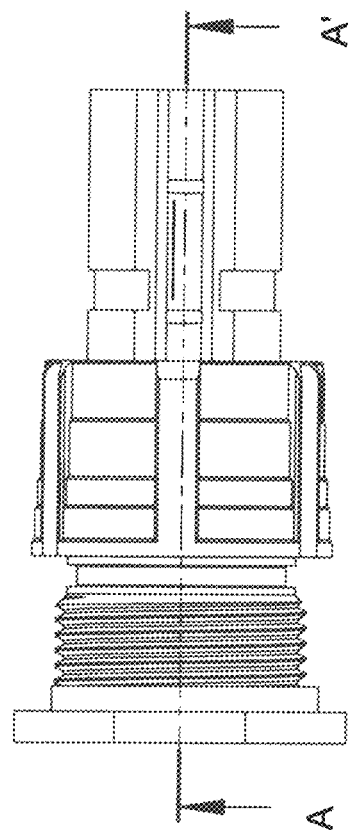
FIG. 4A is a hybrid assembly after full rotation "R" (FIG. 2B)
Figure 4B:
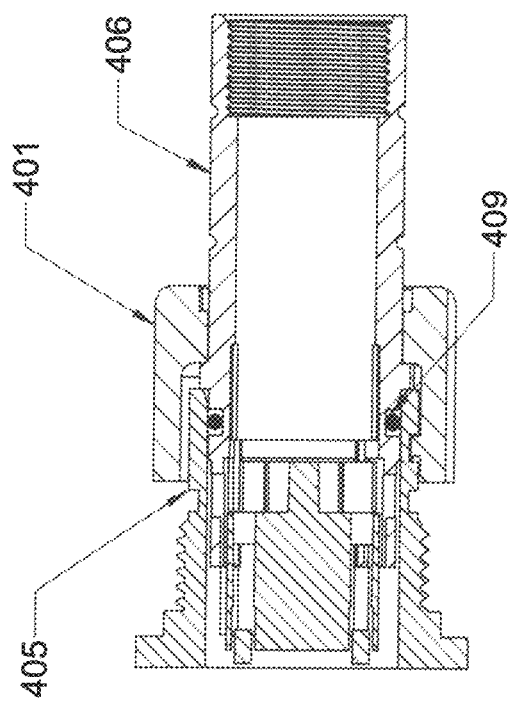
FIG. 4B is a cross-section along line A-A' of FIG. 4A.

FIG. 4A depicts another hybrid assembly (400) with cut-line A-A'. FIG. 4B is a cross-section of FIG. 4A along line A-A', depicting no gap between adapter 405 and connector body (406) and no gap between connector body 406 and bayonet coupling nut 401, and with O-ring (409) installed to protect against water and debris ingress.

Figure 5B:
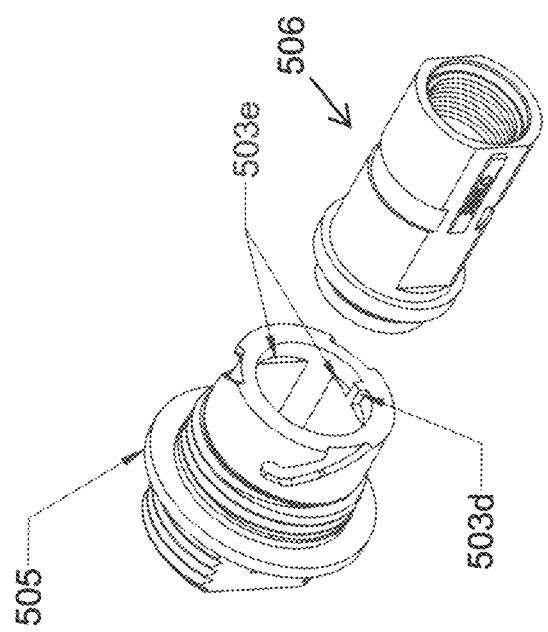
FIG. 5B is an exploded backside view of FIG. 5A.

FIG. 5A depicts another embodiment of a hybrid assembly using the present invention. Connector body (506) contains alignment slot (503c) that engages a corresponding alignment rib (503d) (FIG. 5B) and connector body (506) is inserted into adapter until flange (506a) is stopped by insertion depth limiting surface (503e). FIG. 5C depicts a mechanical plane "P" at which slot apex is located on adapter (505). Connector body (506) flange (506a) substantially abuts a distal end of adapter when bayonet end of connector is secured to adapter using the present invention. FIG. 5D depicts connector body (506) secured to adapter within inner cavity substantially up to flange (506a). FIG. 5E depicts slot apex height (507a) along mechanical plane "P". As latch pin (not shown) is inserted into lower latch pin slot (504a), latch pin (502) will be forced over latch slot apex (507) under a rotation force "R", (at FIG. 2B and FIG. 3B) until the latch pin deflects adapter outer housing and the latch pin comes to rest in slot upper channel (504b). The higher slot apex (507a), the more rotation force is needed to push pin by slot apex and the louder a "click" sound results. This rotation force is also called the pull force need to dislodge the connector and bayonet coupling nut from the adapter instead of rotating the coupling nut.

Figure 6A:
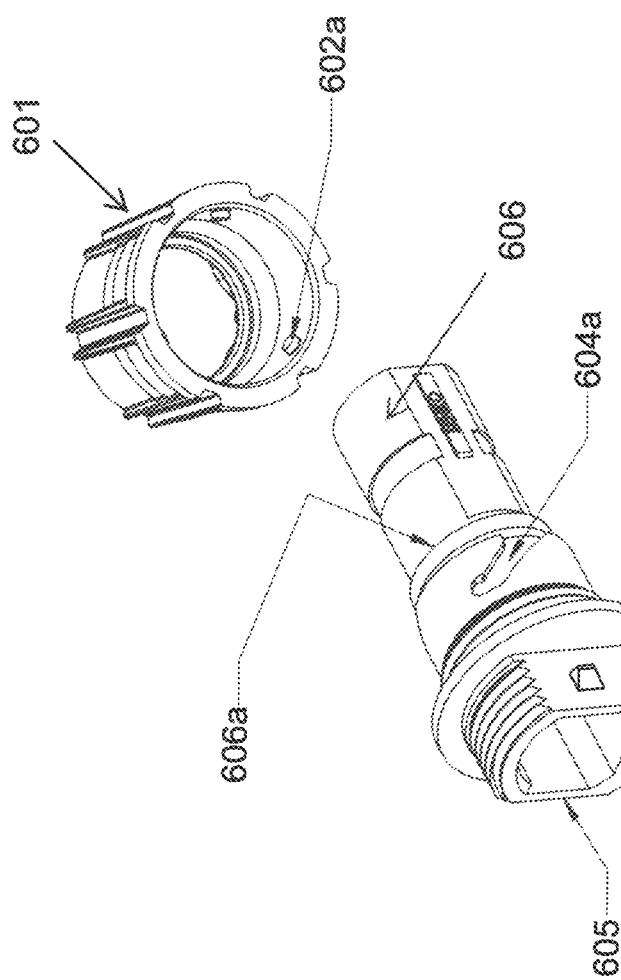
FIG. 6A is an exploded view of prior art bayonet coupling nut prior to attaching to an adapter deploying the latch slot apex invention.
Figure 6B:
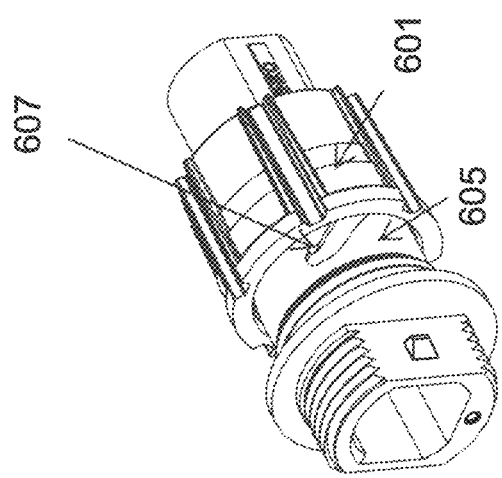
FIG. 6B is a perspective view of FIG. 6A with adapter deploying the present invention

FIG. 6A depicts another hybrid connector. Bayonet nut (601) has a plural of latch pins (602a) spaced about an inner surface at a first end of coupling nut (601). Connector body (606) has flange (606a) that acts as a stop when connector body (606) is secured to adapter (605), as shown. Adapter outer housing (605a) has a plural of latch slots (604a) corresponding with latch pins (602a). FIG. 6B depicts bayonet coupling nut (601) partial rotated onto adapter (605) with slot apex (607) formed in the slot channel or latch slot (604). FIG. 6C depicts a cut-away view on coupling nut (601) of FIG. 6B showing bayonet latch pin (602) location during rotation. FIG. 6D depicts latch pin (602) entering latch slot (604) on adapter outer housing (605a).

FIG. 7A depicts another hybrid assembly (700) with connector body (706), bayonet coupling (701) and adapter (705) partially assembled that deploys the present invention formed as part of the adapter housing (705). FIG. 7 is a similar hybrid assembly as show in FIG. 2 and FIG. 5. The hybrid assembly herein are formed of an adapter (705), connector (706) and coupling nut (701) and found in various configurations in the prior art, the difference is in the present invention slot apex (707) is not prior art, and replaces compression spring (906) found in prior art devices.

FIG. 7B depicts a zoomed view of bayonet latch pin (702) at slot apex (707). At this point a maximum force is being applied to bayonet nut (701) to move latch pin (702) beyond slot apex (707), and bayonet nut housing flexes outward, as described above, as pin (702) passed over slot bump or apex (707). FIG. 7C depicts a rear view of FIG. 7A (with like elements disclosed in FIG. 7C). FIG. 7D depicts latch pin (702) at mechanical plane "P" (refer to FIG. 5D and FIG. 5E). Plane "P" is the point at which the latch pin is passing over slot apex or bump, and once beyond slot bump a detectable "click" or audible noise is heard notifying the user the assembly is completed and secured.

Figure 8D:
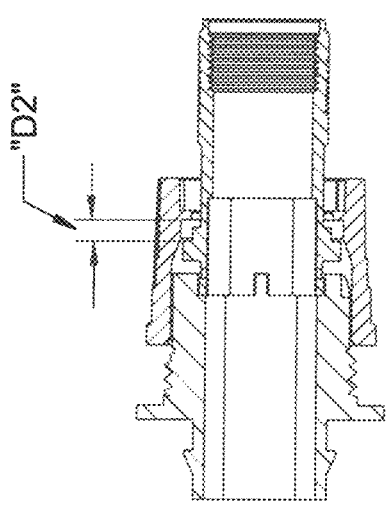
FIG. 8D is a cross-section along cut-line F-F.
Figure 8C:
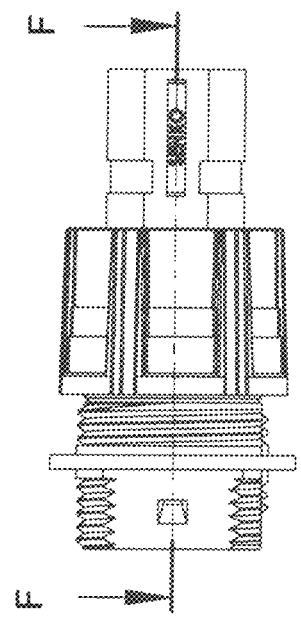
FIG. 8C is side view of prior art hybrid connector assembly with a cut-line F-F.

FIG. 8A depicts a side view of hybrid assembly (700) of FIG. 7A. Bayonet housing (801) is coupled to adapter (805) thereby securing connector housing (806) to adapter (805) forming hybrid assembly (800). FIG. 8B is a cross-section view of FIG. 8A along line D-D. FIG. 8B shows the distance "D2" (refer FIG. 8D) is equal to distance "D1" (refer to FIG. 8B) when latch pin (702) is a slot apex (707). "D1" distance is the same as the slot apex height. FIG. 8C depicts side view of hybrid assembly (800) with a cross-section line F-F cross-sectioned in FIG. 8D depicting distance "D2".

Figure 9A:
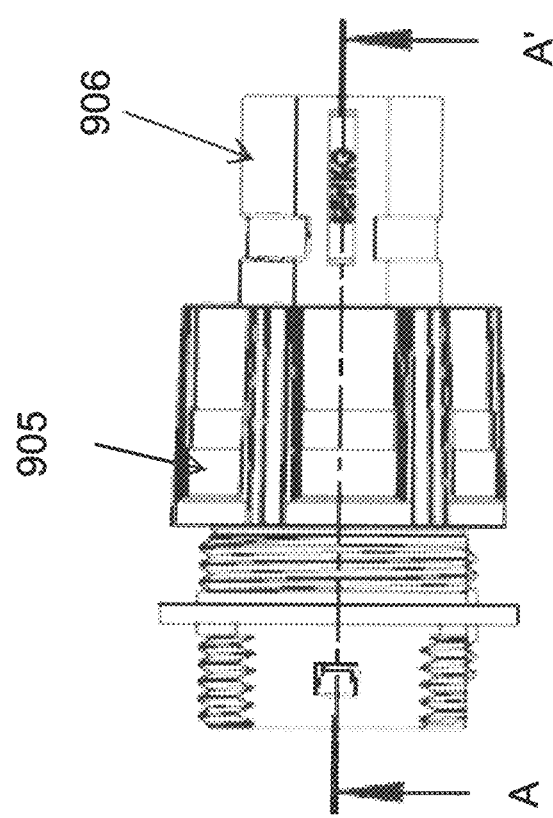
FIG. 9A is a perspective view of another hybrid connector along cut-line A-A'

FIG. 9A depicts connector body (906) fully inserted into adapter (905) with cut line A-A' shown as a cross-section in FIG. 9B. FIG. 9B depicts cross-section of FIG. 9A along line A-A' showing connector housing (906), adapter (905) and bayonet coupling nut (901). FIG. 9C depicts Gap=A (900a) where water or debris may ingress when hybrid assembly is formed. This Gap-A (900a) is secured with O-ring (909)(at FIG. 9E). Gap-B (900b) is used by bayonet coupling (901) to push connector housing (906) to maintain the desired latched condition with adapter (905). A spring force needs to provide positive pressure to help maintain latch pin (902) within the slot recess and to compress O-ring (909) positioned within Gap-A (900a). Compression spring (906) is located at Gap-B (900b).

FIG. 9D is the prior art hybrid assembly with cut-line G-G cross-sectioned at FIG. 9E. FIG. 9E depicts a pull force "F" that exceeds spring force (906), so the spring needs to be properly designed to ensure is can withstand "F" so as not to increase Gap-A (900a) and allow for water or debris ingress around O-ring (906). As depicted in FIG. 9F, Gap-A (900a) and Gap-B (900b) may result when "F" is larger than spring constant of spring (906). The present invention removes Gap-B and spring (906) further reducing water and debris ingress over prior art hybrid assembly.

Referring to FIG. 9E depicts assembly hybrid adapter with a force "F" pulling on connector housing (960) in a distal direction. If "F" is too large or greater than the spring force (906) then gaps form, as shown in FIG. 9F. In FIG. 9E, Gap-A (900a) is filed using rubber seal or O-ring (909), which is called a "face seal". And a second Gap=B (900b) that holds an optional compression spring or bias device (906). In FIG. 9F, secondary gaps (900 a.1) and (900 b.1) are formed allowing the ingress of water and debris due to excessive pill force "F" applied.

The present invention depicted in FIGS. 1-4 moves slot bump or apex (107) into the path of latch pin (102) that is rotated through lower latch channel (104a) to upper latch channel (104b), wherein the latch pin (102) is secured with recess (104c). This removes compression spring (906) from the prior art hybrid assembly reducing cost and improving manufacturing. Slot apex (107) has leading chamfer face (107a) and trailing chamfer face (107b). Leading chamfer face (107a) or trailing chamfer face (107b) may be the first chamfer face or second chamfer face as claimed. The leading chamfer face may have a more gradual slope than the trailing chamfer face. The trailing chamfer face should have a larger slope corresponding to retention force or pull force "F" that is needed to avoid separating the bayonet coupling nut or to prevent pulling the hybrid assembly rearward and creating water ingress gaps as described in FIG. 9F. Once latch pin 104 (FIG. 2C) passes over latch apex (107), latch pin (102) is secured within recess (107c) without the need for bias spring (906). This reduces components, increases manufacturability, and the pin in the recess adds stability to the connector from coming apart under vibrations. Also, removing the spring (906) (FIG. 9C) allows Gap-B (900b) to be eliminated removing another debris and water access point into the connector main body.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances were a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A fiber optic connection system for securing two dissimilar fiber optic devices, the fiber optic connection system comprising:
   a first fiber optic device;
   a second fiber optic device, each of the first and second fiber optic devices having a longitudinal axis and a surface extending circumferentially about the longitudinal axis:
   wherein the first fiber optic device includes a latch pin protruding radially from the surface of the first fiber optic device with respect to the longitudinal axis of the first fiber optic device;
   wherein the second fiber optic device includes a slot recessed radially into the surface of the second fiber optic device with respect to the longitudinal axis of the second fiber optic device; said slot having an open first end, a closed second end, and a length extending from the open first end to the closed second end, the slot comprising a bottom wall and opposing first and second side walls, each of the bottom wall and the opposing first and second side walls extending along the length of the slot from the open first end to the closed second end, the bottom wall facing radially outward with respect to the longitudinal axis of the second fiber optic device, and an apex between the open first end and the closed second end;

wherein the slot includes a recess extending lengthwise in a direction substantially perpendicular to the longitudinal axis from the apex to the closed second end; and wherein the apex is sized and shaped to allow the latch pin to pass beyond said apex and be received in the recess for connecting the first fiber optic device to the second fiber optic device;

wherein the apex protrudes radially outward from the bottom wall of the slot with respect to the longitudinal axis of the second fiber optic device and is located between the opposing first and second side walls; and wherein the fiber optic connection system is springless such that the fiber optic connection system is configured to retain the latch pin in the recess without a bias spring acting on the latch pin.

2. The fiber optic connection system according to claim 1, wherein the apex has a leading chamfer face and a trailing chamfer face, and further wherein the leading chamfer face has a more gradual slope than the trailing chamfer face.

3. The fiber optic connection system according to claim 2, wherein the trailing chamfer face is forward the leading chamfer face, and blocks the latch pin from being removed from a recess formed in an upper slot unless a pull force "F" exceeds the amount of pull force "PF" to overcome the apex.

4. The fiber optic connection system according to claim 1, wherein the apex is selected from one or more of a bump and a protrusion.

5. The fiber optic connection system according to claim 1, wherein the first fiber optic device is a coupling nut with at least one latch pin on an inner surface, at a proximal end of the coupling nut.

6. The fiber optic connection system according to claim 5, wherein the second fiber optic device is an adapter with an outer housing having at least one slot configured to accept the at least one latch pin.

7. The fiber optic connection system according to claim 6, wherein the first fiber optic device further comprises a connector housing and wherein the coupling nut is configured to secure the connector housing to the adapter, and further wherein the connector housing further comprises fiber optic connectors and power contacts for mating to a second adapter to establish a communication and power path from one portion of a network to another.

8. The fiber optic connection system according to claim 7, wherein the connector housing further comprises a gap for receiving an O-ring for preventing water or debris ingress within the connector housing.

9. The fiber optic connection system according to claim 7, wherein when the coupling nut has a forward facing portion, the connector housing has at a forward facing portion and a rearward facing portion, and the adapter has a tip, and wherein when the latch pin is received in the recess:

the forward facing portion of the coupling nut directly engages the rearward facing portion of the connector housing such that the forward facing portion of the coupling nut directly engages the rearward facing portion of the connector housing are end-to-end along the longitudinal axis with no gap therebetween; and the tip of the adapter directly engages the forward facing portion of the connector housing such that the tip of the adapter and the forward facing portion of the connector housing are end-to-end along the longitudinal axis with no gap therebetween.

10. The fiber optic connection system according to claim 1, wherein the first fiber optic device is configured to flex outward under the force of the latch pin passing over the apex.

11. The fiber optic connection system according to claim 1, wherein the apex height determines the pull force required to disconnect the first fiber optic device from the second fiber optic device.

12. The fiber optic connection system according to claim 1, wherein the latch pin is configured to pass over the apex thereby resulting in an audible sound for indicating a hybrid assembly is formed.

\* \* \* \* \*